Figure 1:
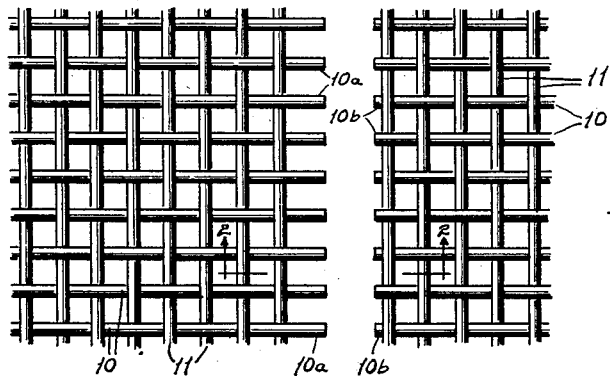

Inventor
Antonio Longoria

Sept. 4, 1934.   A. LONGORIA   1,972,529
WELDING APPARATUS
Original Filed April 28, 1933   2 Sheets—Sheet 2

Inventor

Antonio Longoria

By Bates, Golrick & Teare
Attorneys

Patented Sept. 4, 1934

1,972,529

UNITED STATES PATENT OFFICE 1,972,529

WELDING APPARATUS

Antonio Longoria, Lakewood, Ohio, assignor to The Lindsay Wire Weaving Company, Cleveland, Ohio, a corporation of Ohio Original application April 28, 1933, Serial No. 668,980. Divided and this application December 28, 1933, Serial No. 704,321

5 Claims. (Cl. 219—8)

This invention relates to an apparatus for electrically welding materials, such as wires of extremely small diameter, and is a division of my copending application Serial No. 668,980, filed April 28, 1933. This invention finds especial application in the welding of woven wire fabric so as to make a seam for wire belts that are used on Fourdrinier paper making machines, although it is applicable for welding any two strips of metal.

Considering first the problem in connection with the manufacture of paper making wires, the only known prior practical methods of making a seam have been to solder or braze the ends of the fabric together, but this involved the use of fluxing material, which did not possess sufficient strength to withstand the wear. Furthermore, the flux would clog the openings and thereby interfere with the drainage and result in a mark on the paper that is formed directly over the seam.

For years, efforts have been made to join the ends of the fabric by direct fusion of the metal, but they have been directed mainly to a unit that has been made by the application of heat through the agency of a blow torch or other gaseous flame. Experience has shown however, that this method is unsatisfactory, for if the heat is applied an instant too long, the metal is burned, while if it is applied for an insufficient length of time, the seam is imperfect. The difficulty of maintaining the proper rate of application of heat to the fabric will readily be apparent, when it is considered that paper making wires have an average of sixty wires to an inch, and that each wire is approximately ten thousandths of an inch in diameter. Another consideration is the fact that the wire is made of relatively soft material such as brass or bronze, and therefore has a low melting point. These factors, coupled with the additional problem of holding the overlapping picket ends in close relationship, have made the use of a torch impractical for seam welding purposes.

Ordinarily electric welding is considered to be an equivalent of flame welding. I have found however, that such is not the case in the welding of wires of very small size. I have found, for example, that the ordinary practice of welding with alternating current burns the metal, and I have found that the substitution of direct-current from a generator or battery not only melted the metal, but left it spongy, that is, it contained entrapped gas pockets that resulted in a seam, which was too weak to be practical.

An object of the present invention therefore, is to perfect an apparatus for electrical welding, which can be used satisfactorily for welding wire fabric of the size that is used in the manufacture of paper making wires. A further object is to produce apparatus, which can be operated with unskilled labor, and which does not result in a weld that has the objectionable features of a weld produced by the flame process.

Figure 2:
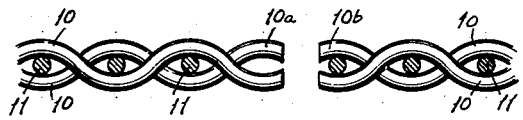
Figure 3:
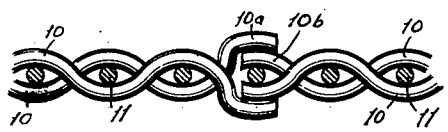
Figure 4:
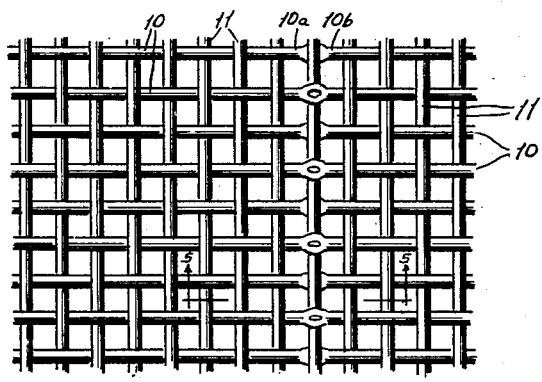
Figure 5:
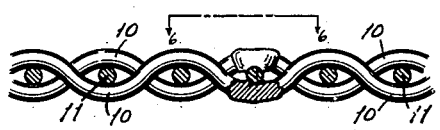
Figure 6:
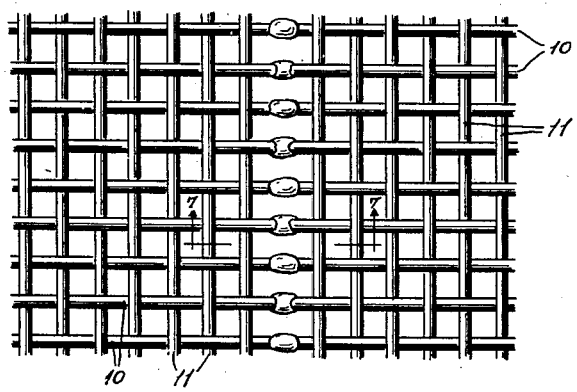
Figure 7:
Figure 8:
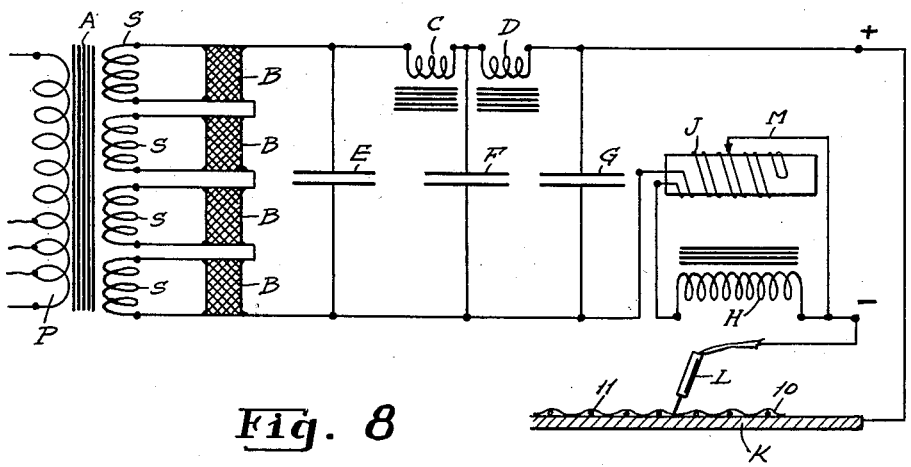

In the drawings, Fig. 1 is a top plan view of part of a web of woven wire fabric with the ends in close proximity to each other, and showing the last weft wire removed from one end of the fabric; Fig. 2 is a section taken on an enlarged scale on the line 2—2 in Fig. 1; Fig. 3 is a section similar to that in Fig. 2, but showing one end of the fabric in a position for welding with reference to the other end; Fig. 4 is a top plan view of part of a completed welded fabric; Fig. 5 is a section taken on an enlarged scale on the line 5—5 in Fig. 4; Fig. 6 is a top plan view of a section taken on an enlarged scale on the line 6—6 in Fig. 5; Fig. 7 is a section taken on an enlarged scale on the line 7—7 in Fig. 6, and Fig. 8 is a wiring diagram.

I have found that a pulsating alternating current of the usual service supply can be used satisfactorily for accomplishing the welding of strips of metal, such as small wires, provided the current is rectified, then filtered and controlled so as to produce a surge of current only at the desired time and place during the welding operation. This surge is obtained by building up a charge of current and then discharging it instantaneously through the metal to be joined. This method is unlike arc welding, for in arc welding the current flows continuously across a gap as the electrode is moved along the work. In the present instance the weld is effected by an instantaneous discharge which is accomplished only when the electrode is moved away from the work. In other words, the apparatus does not permit a discharge of current until contact is made between the work and the electrode, and permits a sudden and complete discharge only when the electrode is withdrawn from the work. Thus, a weld can be progressively made across a seam by touching the electrode to the work, then lifting it and again touching it at the next point where the weld is desired.

My invention is shown in connection with the welding of wire fabric to make a seam for Fourdrinier belt. Accordingly in Fig. 1 the warp wires are indicated at 10 and the weft wires at 11. The last weft wire at one end of the belt is removed and the picket ends are thus opened. The opposite end of the belt may then be inserted through the open ends and the pickets may be bent over so that the warp wires form a continuation of the same weave. Fig. 3 shows the end pickets 10a that have been formed by the removal of the last weft wire, while 10b indicates the picket ends on the opposite end of the fabric. While the wires are so held, they are fused together by an electric welding operation. In the preferred arrangement, the pickets 10a overlap the pickets 10b in such manner that as viewed vertically the two wires represent a continuation of one wire. If desired, however, the wires may overlap in side by side relationship, or they may be placed in end to end abutting relationship, as shown in Figs. 6 and 7.

The welding apparatus, which I utilize includes a transformer A, which has a primary P that is connected across the usual alternating current service line, and has a secondary S which preferably comprises four coils that are arranged in side by side relationship. The transformer is preferably the shell type, wherein the primary is wound on a core that forms the middle leg of a closed magnetic path, while the secondary is wound around the primary. The pulsating current is then rectified, preferably with a full wave dry rectifier, B, there being one rectifier for each secondary coil, and the rectifiers are connected in series to the secondary coils. The rectified current is then filtered by suitable filters, such as choke coils C and D, that are placed on one side of the line between condensers E, F and G. The filtered current is then further controlled by a high inductance filtering unit H and a resistor J. The inductance of the unit "H", however, is higher than the combined inductance of units "C" and "D". At the output end, the positive side of the line is connected to a conductor plate K on which the work is laid, while the negative terminal is connected to an electrode which is shown as a needle-like member having an insulated covering that suffices for a handle.

The welding operation is performed by laying the work on the plate K aligning the picket ends as hereinbefore described and progressively making contact on the picket ends and pressing them together with the end of the needle L, and then lifting the needle and repeating the operation with the next set of picket ends. When contact is made between the needle and the wire, a circuit is completed through the work, and a charge is built up in the condensers E, F, and G. Then when the needle is raised, the current in the condensers is instantaneously discharged and the weld is thereby made.

The apparatus which has just been described is suitably balanced electrically to produce a weld that will not burn wire of the size that is used in the manufacture of Fourdrinier belts. For example, I have found that satisfactory results can be obtained in the welding of fabric wherein the warp wires are approximately nine-thousandths of an inch in diameter, and wherein the weft wires are approximately ten thousandths of an inch in diameter, if the various parts of the apparatus have the following characteristics. Assuming an input of 110-volts alternating current, the primary winding of the transformer A can have 120 turns of two layers of sixty turns each of No. 17 cotton enameled wire while each secondary can be wound in three layers aggregating 14¾ turns of No. 17 cotton enameled wire. The first layer of the secondary may have six turns, the second—five turns and the third, three and three-quarter turns. The rectifiers B can be purchased in the open market as dry rectifiers having a rating of twelve volts and six amperes each. The condensers E and F each may have a capacity of six hundred microfarads while the condenser G has a capacity of twelve hundred microfarads. The filtering units, or choke coils C and D are rated at three henries at a full load of six amperes, and are low inductance coils, while the unit H is a high inductance coil of approximately 25 henries at a full load of six amperes.

I have found that for best results the resistor J must be non-inductive and non-capacitive. I have made a resistor of this type by bending a length of wire intermediately, and winding it in the form of a single layer coil by starting at the bent portion, and maintaining the adjacent turns out of contact with each other. The ends are then connected in the circuit, as shown in the wiring diagram while a sliding contactor M is connected across the unit H, as shown. The contactor at all times bridges at least two turns of the wire. The resistor may be a nickel copper alloy, such as that which is known in the trade as "Advance" wire and may be made of No. 32 wire. The resistor stabilizes the filtering unit H during the welding operation, and provides the adjustment that may be necessary to compensate for the difference in thickness and kind of wire to be welded. Additional adjustments may be made by the use of taps on the primary of the transformer A, as shown in the wiring diagram in Fig. 8.

An electric apparatus of the characteristics described produces a maximum of 48 volts no load at the output end, as compared to an input of 110-volts. It is to be understood however, that I may adjust the electrical characteristics to vary the output in accordance with the physical characteristics of the metal to be welded.

An important advantage of my invention is the fact that I have produced an apparatus by means of which strips of metal and particularly wire of approximately ten thousandths of an inch in diameter may be welded without requiring skill on the part of the operator. This result possesses extremely important advantages for it thus produces for the first time, so far as I am aware a Fourdrinier belt wherein the seam is electrically welded merely by the fusion of the metal that comprises the warp wires.

I claim:—

1. An electrical apparatus for welding small strips of metal including in combination a transformer, a rectifier, a plurality of condensers connected in parallel across the conductors of the rectified current, filtering means on one side of the line between the condensers, a stationary contactor connected at the positive side of the line and adapted to support the work to be welded, a movable contactor connected to the negative side of the line, and means in the circuit between the contactor and condensers for storing current in sufficient quantity to make a welding arc only when the movable contactor is withdrawn from engagement with the work.

2. An electric welding apparatus comprising in combination a source of direct current supply, a stationary contactor adapted to support the work to be welded, a movable contactor, a circuit between the source of supply and contactors, and means in the circuit for storing current therein only when the circuit is closed through the work and contactors, and a variable resistor in the circuit.

3. An apparatus for electric welding comprising in combination a source of direct current supply, a circuit between the source of supply and the parts to be welded, means for closing the circuit at the point where the weld is desired, means in the circuit for storing up a charge of current therein when the circuit is closed, and a variable resistor in the circuit, said resistor being non-inductive and non-capacitive.

4. An apparatus for electrically welding small strips of metal including in combination, a source of direct current supply, a movable contactor for establishing a circuit between the source of supply and the work, and means in the circuit for storing current, the constants of said circuit being such that a welding arc will not pass between the contactor and work until the contactor is withdrawn from engagement with the work.

5. An apparatus for electrically welding small strips of metal comprising in combination, a source of alternating current supply, a transformer having the primary connected to the source of supply, and a secondary to a work circuit, a rectifier connected across the work circuit, filtering means also connected in the work circuit, a movable contactor in the work circuit for engaging the work to be welded, means in the circuit for varying the resistance to the flow of current therethrough, and other means in the circuit for storing current upon establishment of the work circuit, said storage means having such constants that a welding arc occurs only when the contactor is withdrawn from engagement with the work.

ANTONIO LONGORIA.